J. H. BELL.
TELEGRAPH SYSTEM.
APPLICATION FILED NOV. 3, 1917.

1,360,712.

Patented Nov. 30, 1920.
3 SHEETS—SHEET 3.

Fig. 3.

Inventor:
John H. Bell
by J. H. Roberts Att'y

UNITED STATES PATENT OFFICE.

JOHN H. BELL, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

TELEGRAPH SYSTEM.

1,360,712.  Specification of Letters Patent.  Patented Nov. 30, 1920.

Application filed November 3, 1917. Serial No. 200,070.

*To all whom it may concern:*

Be it known that I, JOHN H. BELL, a citizen of the United States, residing at South Orange, in the county of Essex and State of New Jersey, have invented certain new and useful Improvements in Telegraph Systems, of which the following is a full, clear, concise and exact description.

This invention relates to telegraph systems, and more particularly to telegraph repeater systems.

The principal object of this invention is to provide an improved organization of apparatus for rendering efficient repeating service between land lines and submarine cables.

In the development of telegraphic systems, it has always been necessary to recognize that submarine or cable telegraphy relates to a field of signaling practice well defined and distinct from signaling practice in connection with land lines. It is of course well understood that such divergence of methods is, in general, due to the marked difference in the electrical characteristics of submarine cables as compared with land lines. A system capable for rendering satisfactory and efficient service in the field of land line telegraphs would be inadequate and perhaps fail to operate if applied to cable working and conversely a system satisfactory for submarine cable telegraphy if applied to land lines would prove entirely inefficient and unsuited for such service.

It is commonly known that while telegraphic impulses are under transmission on either submarine cables or land lines of other than moderate length, they are subject to unfavorable electrical effects which have a tendency to impair their definition or effectiveness at receiving devices through which they must be manifested.

In submarine cable working it has not been possible to attain other than moderate speeds in transmission as compared with the relatively high speed at which land line systems are readily operated, and it is frequently the case that messages may be transmitted in one direction at a much higher rate of speed than it is possible to attain in the opposite direction over the same cable. Such difference in speed of transmission in the same cable may be due to peculiar electrical characteristics of the cable, although a better balance of the duplex equipment or a more skilled adjustment of the apparatus employed in one direction may be the cause of such difference in speeds.

In providing a system to establish efficient repeating service in opposite directions between telegraphic circuits of widely dissimilar electrical characteristics and to overcome the difficulties inherent therewith, a few of which have already been pointed out, the present invention comprises distributer means, current amplifying means and impulse storing means whereby character selecting combinations of impulses comprising different potentials of individual polarities which form an alternating current may be received, stored and retransmitted in the form of character selecting impulses comprising combinations of different polarities of a direct current. Such relation of receiving, storing and transmission of impulses corresponds with messages routed in one direction, and accordingly the converse of such order of the currents from which impulse selecting combinations are formed apply to messages routed in the opposite direction. In the regeneration and translation of impulses it is further contemplated to attain a strength or clearness of definition at impulse receiving devices to reliably and efficiently control the recomposing of the impulses into a printed message at terminal stations and also to reproduce a printed message at the repeater station in order that such pilot working may serve as a means for "observing service" at the latter point.

This invention is illustrated diagrammatically in the accompanying drawing in which only so much of a telegraph repeating equipment has been shown as will be necessary to a clear understanding of the invention.

Referring to the drawing.

In the embodiment chosen for illustrating the present invention, message transmission is based on a well known five-unit impulse code whereby each character or other operation necessary in the transmission and printing of a message is distinguished from all other characters or operations, by a certain combination or permutation of current impulses. On the land line circuit, five impulses comprising permutations of currents of positive and negative polarities are employed, while on the cable circuit five impulses comprising successive alternations or half-cycle current periods are rendered selective through permutations of impulses having predetermined minimum strength and impulses incremented to a maximum current strength.

Figure 1:
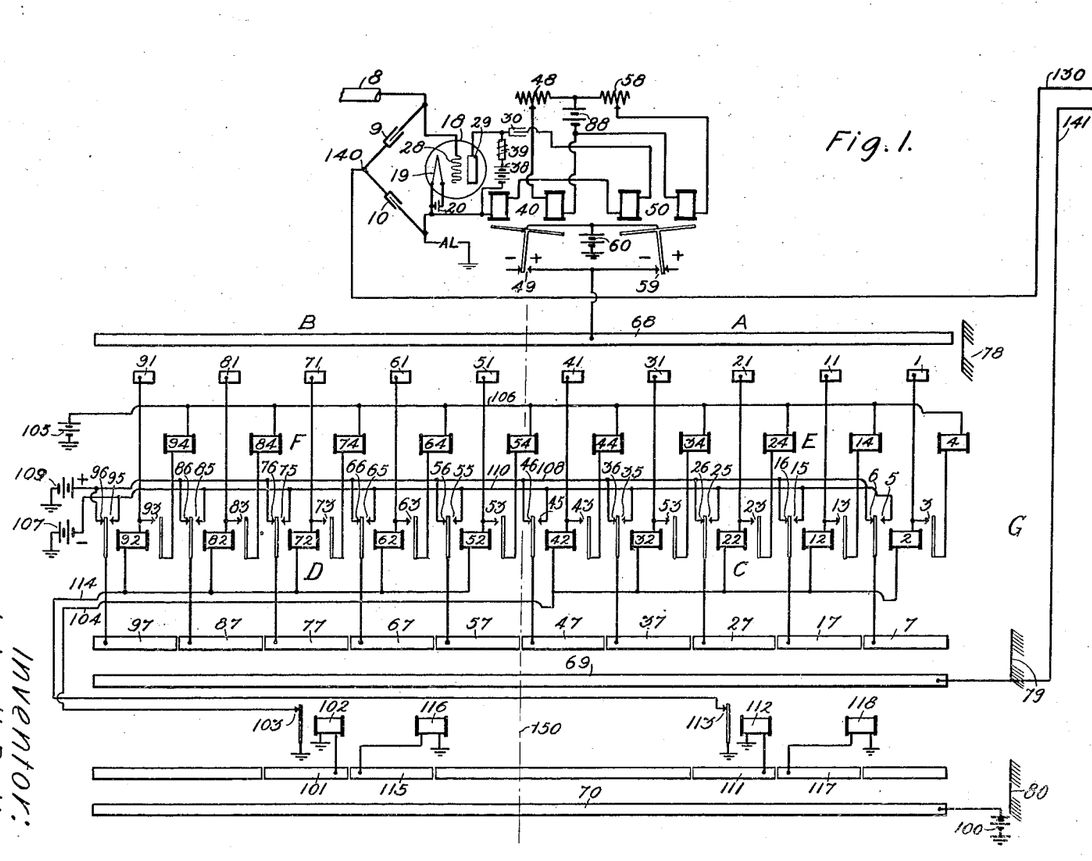
Figure 1 illustrates an equipment suitable for the reception and retransmission of telegraphic messages from a submarine cable to a land line.

Referring to Fig. 1 of the drawing, the reference character 8 indicates a submarine cable terminating in a cable bridge duplex equipment comprising bridge-arm condensers 9 and 10, an artificial line AL, and an amplifying repeater 18, of the well known thermionic type. Two relays 40 and 50 of polarized type are adapted to be selectively controlled by the action of impulses of alternating current from the cable 8 as received through the repeater relay 18. In order that the polar relays 40 and 50 may be conveniently adjusted to margins or operating range limits whereby they will remain inert under currents of predetermined strengths and responsive only to currents of incremented strengths the right-hand winding of each relay is connected through an adjustable resistance 48, 58, respectively, with a source of current 88. The armature of each relay is normally retracted or biased to the position in which it is shown, due to the action of the biasing current in each right-hand coil.

The repeater 18 is of the audion type and comprises a thermionic cathode or filament 19 which is heated by current from a source 20, an input electrode or grid 28, and an output electrode or plate 29. The output electrode 29 is maintained positive with respect to the filament 19 by a source of direct current 38. In arrangements of this sort it is preferable to place an impedance 39 in series with the direct-current source, and to connect the true output or work circuit in parallel with the battery and impedance. Such work circuit customarily contains a condenser 30 so that the work circuit is affected only by changes in the output current.

Those familiar with the operation of the audion and similar devices, will appreciate that any change in potential difference between the electrodes 19 and 28 will cause a corresponding change in current in the work circuit. Included in this work circuit are windings of each of the relays 40 and 50, which being marginal in operation are not affected by line reversals of normal strength, but the one or the other of these relays will respond to an augmented half wave, depending on whether this wave is of positive or negative polarity to connect the ring 68 of distributer G with the source of current 60. It may be pointed out that from the standpoint of switching results it will be understood a relay of neutral type would serve as a substitute for the two polar relays 40 and 50. The polar relays, however, represent a preferred arrangement due to better operating efficiency and to the fact that the current method of biasing to obtain marginal operating adjustments has proven more satisfactory than mechanical adjustments.

Referring to the distributer G, it will be understood that it may be of any suitable form and preferably of a rotary type of which the drawing presents a developed view wherein three contactor brushes 78, 79 and 80 may be carried by radial arms from right to left through their respective paths, as well understood in the art. A dotted line 150, inserted for convenience of description divides the distributer into equal right and left-hand zones A and B, which on a four-arm or quadruplex distributer would each correspond with a quadrant thereof. Adjacent the collector ring 68 five segments 1, 11, 21, 31 and 41 in zone A, and five segments 51, 61, 71, 81 and 91 in the zone B are traversed by the brush 78 to respectively control five storing relays 2, 12, 22, 32 and 42 indicated as a group C in the zone A and five similar relays 52, 62, 72, 82 and 92 indicated as a group D in the zone B. The storing relays C and D control the polarity of currents selected from oppositely poled grounded sources 107 and 109 for inclusion with segments 7, 17, 27, 37 and 47 and 57, 67, 77, 87 and 97 respectively, positioned adjacent a collector ring 69. In traversing these segments and collector ring 69, the brush 79 establishes connection from the current sources 107 and 109, in combinations as previously selected by the relays C and D, to a conductor 141 which extends to (Fig. 2) the neutral point of a differential duplex formed by a polar relay 98, an artificial line AL and a land line conductor 142. As well understood in the art such impulses by way of the conductor 141, while neutralized and therefore rendered non-effective in the relay 98, will act through the line conductor 142 to operate suitable impulse receiving means at a distant station, not shown.

The relays C also control the operation of magnets 4, 14, 24, 34 and 44 indicated as a group E, and the relays D similarly control magnets 54, 64, 74, 84 and 94 comprising a group F. The magnet groups E and F respectively control (by suitable means not shown) telegraph receivers employed as pilot or service observing receivers for the convenience of attendants at the repeater station as already mentioned.

A third path or section on the distributer

G comprises a collector ring 70 and segments adjacent thereto traversed by the brush 80. At a proper moment this brush connects a source of current 100 by way of the collector ring 70 and a segment 117 to operate a magnet 118, whereby suitable mechanism controlled thereby initiates a printing cycle on the observing printer assumed to be responsive to the magnets F. Immediately following this action the brush 80 establishes the source 100 over a segment 111 to operate a relay 112, whereby separation of its contacts 113 disconnects a bus conductor 114 to disable the five storing relays comprising the group D. It will be understood that such releasing of the relays D clears out a previously stored combination of five impulses corresponding with a character already received from the cable 8, retransmitted to the land line section 142 and also recorded on the service observing printer by the printing cycle just initiated through the operation of the relay 118. In a similar manner the brush 80 in turn traverses a segment 115 to operate a printing cycle control relay 116 effective on the service observing receiver assumed to be associated with the group of selecting magnets E. Following this action the brush 80 passes over a segment 101 to operate a release relay 102 and on the separation of its contacts 103 a bus conductor 104 is disconnected to disable all of the relays comprising the group C. The printing cycle and release of the relays C clears out an impulse combination previously received from the cable 8, and retransmitted to the land line section 142 in a manner similar to that described for the other zone of the distributer.

A suitable synchronizing arrangement (not shown) will be understood as present to maintain the trailer brushes 78, 79 and 80 in step with impulses incoming from the cable 8 in such a manner that five successive impulses representing a character of one message will be in step with the brush 78 as it successively sweeps over the five segments in the zone A, and five impulses corresponding with a character for a second message will successively arrive in phase with the presence of the brush 78, over corresponding ones of the five segments in the zone B. The sending brush 79 may be arranged to travel slightly in the rear of the receiving brush 78 or it may follow one entire zone to the rear of the receiving brush and in turn the clearing out brush 80 may travel in phase with the sending brush. Such spacing arrangement of the brushes insures ample time for operation and so-called "settling" of the storing relays C and D, and operation of the selecting magnets E and F and proper retransmission or repeating of impulses before a combination is cleared out. For convenience of description, however, it may be assumed that the three brushes travel in phase one with the others in the positions in which they are shown in the drawing.

For the purpose of a first illustration let it be assumed that five successive impulses, each of minimum strength, are received from the cable 8 during an interval the trailer brushes are traversing the distributer zone A and that another five succesive impulses of incremented strength arrive over the cable during the period the brushes are in the zone B. Accordingly, since the impulses of minimum strength do not result in operation of either one of the marginal relays 40 or 50, their associated contacts 49 and 59 remain open, whereby the collector ring 68 continues non-energized; therefore no operating circuit may be established by the brush 78 to the relays C and this brush accordingly idly traverses its path in the zone A during such five-impulse interval. The inert position of the relays C permits the sending brush 79 to succesively connect the source of positively poled grounded current 109 with the collector ring 69, thence over the conductor 141 to the land line section 142. The current paths extend from a current bus 108, contacts 6, 16, 26, 36 and 46 of the relays 2, 12, 22, 32 and 42, respectively, as the brush 79 passes over the corresponding segments 7, 17, 27, 37 and 47 and successively joins them with the ring 69. The succeeding combination of five incremented impulses from the cable 8 alternately operates the polar relays 40 and 50 to connect the source of current 60 over the contacts 49, 59, respectively, with the collector ring 68. For the first impulse the brush 78 will be passing over the segment 51, thereby connecting the source 60 through the winding of the relay 52, the relay bus conductor 114, and contacts 113 of the lock release relay 112 to earth. The relay 52 thereby operated establishes a self-locking circuit from a source of grounded current 105, a bus conductor 106, the winding of selecting magnet 54, contacts 53 of the relay 52, whereby the source of current 105 is substituted for the source 60. In a similar manner each one of the storing relays 62, 72, 82 and 92 will be operated as the brush 78 sweeps over the corresponding segments 61, 71, 81 and 91. The four last mentioned relays self-lock over their respective contacts 63, 73, 83 and 93 through corresponding magnets 64, 74, 84 and 94. Through respective contacts 55, 65, 75, 85 and 95 of the relays 52, 62, 72, 82 and 92, a negatively poled current bus 110 extending from the grounded current source 107 is correspondingly connected with segments 57, 67, 77, 87 and 97 of the distributer; therefore, as the brush 79 passes over these segments impulses of negative current are impressed, by way of the collector ring 69 and conductor 141, on the land line section 142.

From the foregoing description it will be obvious that in response to a combination of five impulses comprising permutations of different current amplitudes, storing relays corresponding in position of sequence to the stronger impulses will be operated, while storing relays corresponding with impulses of minimum strength will remain inert, and therefore the trailer arm 79 in passing over the associated segments will transmit a permutation of impulses to the line 142 wherein the polarities will be negative for the operated storing relays and positive for the non-operated relays. As commonly referred to in printing telegraphs, in the present system the positive impulses to the land line section 142 would be termed spacing impulses, while the negative impulses would be termed marking impulses.

In a proper time relation with the other operations just described, the brush 80 in traversing its path connects the source of current 100 to operate the printing cycle magnets 116 and 118 and the lock release relays 102 and 112 as and for the purposes already described.

Figure 2:
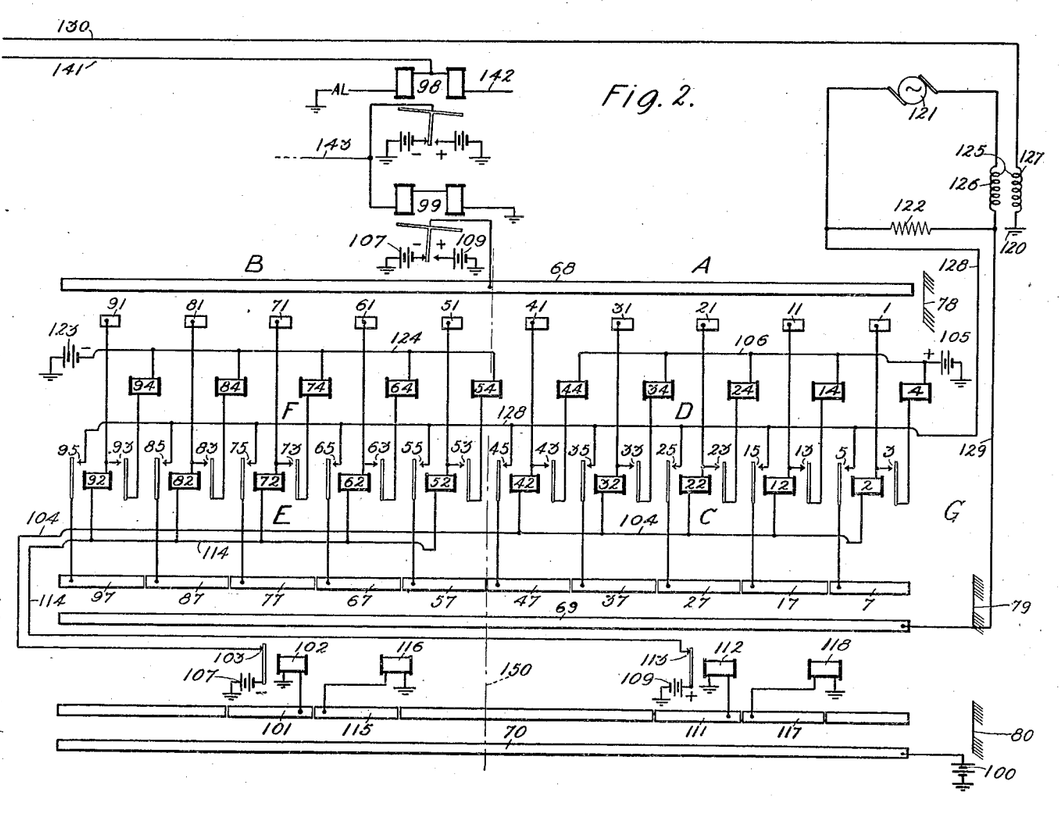
Fig. 2 illustrates an equipment suitable for the reception and retransmission of messages from a land line to a submarine cable.

Referring to Fig. 2 of the drawing, the land line section 142 included through the windings of the polar relay 98 and artificial line AL to earth is also traversed by incoming impulses from a distant station (not shown) whereby the armature of the relay 98 is moved to and fro in phase with the polarity of such impulses. For convenience, it may be assumed that such impulses move the armature to correspondingly establish contact with the associated positive and negatively poled sources of grounded current adjacent thereto. In turn operation of the relay 98 similarly operates a second polar relay 99 connected therewith. A conductor 143 established in derived circuit relation from the conductor which connects the armature of the relay 98 with the winding of the relay 99 is so placed between the two relays that it may be extended to control a suitable synchronizing equipment as well understood in the art.

The distributer equipment employed for this portion of the repeater service is in general similar to the distributer equipment shown and already described in connection with Fig. 1 of the drawing; therefore, similar characters of reference or corresponding progressions thereof will be employed in so far as they may be applied in designating corresponding parts or devices which serve or function to effect relatively similar service operations. In secondarily responding to incoming impulses from the main line 142, as described, the armature of the relay 99 alternately establishes the associated positive and negatively poled current sources 109 and 107 with the collector ring 68 of the distributer G. Since telegraphic characters or symbols are transmitted over the line 142 by five-unit code combinations of different polarities, it will be understood that the brushes 78, 79 and 80 of the distributer will travel from right to left synchronously with incompling impulses from the line 142.

For convenience of description, let it be assumed that five successive positive impulses are received from the line 142 to form part of a mesage under reception through the zone A of the distributer, and that these impulses will be followed by five impulses of alternately negative and positive polarities to form part of a message being received in the zone B of the distributer. The first five impulses will retain the armature of the line relay 98 biased to establish the associated positively poled current source to in turn retain the armature of the relay 99 biased to its positively poled current source 109; therefore, the collector ring 68 will be energized from this current source during the time the brush 78 sweeps over the segments 1, 11, 21, 31 and 41, thereby effecting the operation of each one of the storing relays 2, 12, 22, 32 and 42. In tracing the operating circuit for the relay 2 corresponding with the first one of the five incoming impulses, such path starts from the source of current 109, thence over the armature of the relay 99, collector ring 68, brush 78, segment 1, winding of the relay 2, a bus conductor 104, the contacts 103 of the lock release relay 102, thence through the negatively poled source of current 107 to earth. On responding to current through this circuit the relay 2 establishes a self-locking circuit extending from a current bus 106, included with a positively poled source 105, the winding of the selecting magnet 4, contacts 3 of the relay 2 to the winding of this relay, thereby substituting the source 105 for the source 109, at the relay 99. In a similar manner the other four relays C and magnets D are successively operated through the brush 78 and held locked through corresponding paths closed respectively by the relay contacts 13, 23, 33 and 43 of these relays. The disposition of these stored impulses will be considered presently. Immediately following reception of the five positive impulses the assumed five alternate negative and positive impulses will work the line relay 98 and in turn the relay 99 to alternately establish the sources 107 and 109 with the collector ring 68; therefore the brush 78 in phase with the first negative impulse establishes the collector ring 68 with the segment 51, whence the circuit extends through the winding of the relay 52, a bus conductor 114, the contacts 113 of the lock release relay 112 to the positively poled current source 109. Operation of the relay 52 establishes a self-locking circuit from a source of grounded negative current 123, a bus conductor 124, the selecting magnet 54, the contacts 53 of the relay 52, thereby locking this relay in substitution of current from the source 107 at the relay 99. The second impulse from the line 142 being positive, the relays 98 and 99 will respond and the source 109 will be included with the collector ring 68 at a moment the brush 79 is over the segment 61, thereby extending this connection over the winding of relay 62, the bus 114, the contacts 113 of the relay 112 to the source of positive current 109. Since the source of current 109 at the relay 99 may be considered as the same source 109 present at the relay 112 (or a similarly poled source of equal potential) no current will result through the path just traced; therefore, the relay 62 will remain inert. At a moment the brush 79 is over the segment 71 negative current will be established with the collector ring 68, and the relay 72 will be operated and locked in a manner corresponding with the operations described for the relay 52. At the segment 81 the fourth impulse of positive polarity encountered by the brush 79 permits the relay 82 to remain inert from conditions similar to those described for the relay 62, while the fifth impulse being negative acts over the brush 78 and segment 91 to operate and in turn permit locking of the relay 92 in the same manner as established at the relays 62 and 72.

Directing attention to the retransmission of the impulses stored in the relay groups C and E an alternating current generator 121 developing a single phase current preferably of sine wave form, is included in a closed loop formed through a resistance unit 122 and a winding 126 of a transformer 125. Current in this loop circuit establishes corresponding current action in the winding 127 of the transformer, and a ground 120 permits these currents to traverse a conductor 130 to (Fig. 1) the apex 140 of the cable duplex thence over the cable circuit 8 to an assumed distant station. At the distributer G, Fig. 2, the brush 79 following the brush 78, say the distance of one segment to the rear thereof, on arriving at the segment 7 establishes a circuit from a conductor 128, through the contacts 5 of the relay 2, the segment 7, brush 79, collector ring 69, to a conductor 129. It will be noted that the conductors 128 and 129 are half-tapped at opposite ends of the resistance unit 122 in the generator loop circuit; therefore, the connection just traced effects a short circuit on this unit, thereby permitting the generator 121 to develop a current of maximum strength in the transformer winding 126 and therefore a current of correspondingly induced strength in the cable 8.

In addition to assuming that the distributer G is maintained suitably synchronized with incoming impulses from the line 142, it will be further understood that the generator 121 is also maintained in such synchronous relation with the distributer that a half-wave or one alternation of current developed thereby will be timed to rise and fall symmetrically with a period the brush 79 is traversing one of the segments in its path, and that the zero moments of the generator 121 will therefore occur at such times as the brush 79 is midway between two segments.

Since each one of the storing relays in the group C is now assumed to be held operated, it will be clear that as the brush 79 traverses the remaining segments 17, 27, 37 and 47 of the zone A, circuits typical of those described for the relay 2 will result in the resistance unit 122 being short-circuited during each half-wave alternation from the generator 121. It will, therefore, be obvious that the five successive positive impulses assumed as received from the line 142 were first stored in the relays C and translated by the distributer brush 79 to establish five incremented alternate positive and negative half-wave impulses in the cable 8. At an assumed distant station on the cable the alternating impulses may be received on a bridge duplex arrangement similar to the equipment shown and already described in connection with Fig. 1 of the drawing but arranged to suitably control the receiver of a printing telegraph.

On entering the zone B, the brush 79 establishes a circuit prepared through the contacts 55 of the relay 52, from segment 57 to the collector ring 69, thereby joining the conductors 128 and 129 to short-circuit the resistance unit 122. The separated position of the contact 65 of the relay 62 (now inert) prevents short-circuiting of the resistance 122 during the time the brush 79 is traversing the associated segment 67. In a similar manner the brush in turn respectively short-circuits, non-short-circuits and short-circuits the unit 122 as it passes successively over the last three segments 77, 87 and 97. It will accordingly be clear that the five alternately negative and positive impulses received from the land line section 142 were first stored at the relays E and in turn rendered effective by the distributer to be retransmitted or translated into the cable 8 in the form of five successive alternations or half-waves in the order of maximum, minimum, maximum, minimum and maximum strengths, respectively.

Referring to the brush 80 of the distributer, it may be set to travel in step with the brush 79 as already mentioned, and during its present assumed trip through the zone A will, for convenience of description, be disregarded and attention directed to its arrival in the zone B. Therein this brush first establishes the collector ring 70, included with the current source 100, with the segment 115 to operate the printer control relay or magnet 116 to thereby start a cycle of operations which automatically result in establishing on the service observing printer assumed to be under control of the magnets D a record or other code action corresponding with the five positive impulses received by the relays C from the line 142. On arriving at the segment 101, the brush includes the current source 100 to operate the lock release relay 102, and separation of contacts 103 thereof disconnects the relays C which thereupon restore and in turn release the magnets D. On reëntering the zone A, the brush includes the source 100 over the segment 117 to operate the magnet 118, whereby a printing cycle is started to record on an observing printer controlled by the magnets F, a character or other code operation corresponding with the five alternate negative and positive impulses received from the line 142 and stored by the relays E. At the segment 111 the brush 80 effects operation of the relay 112, thereby releasing the relays of group E and also the magnets F.

Figure 3:
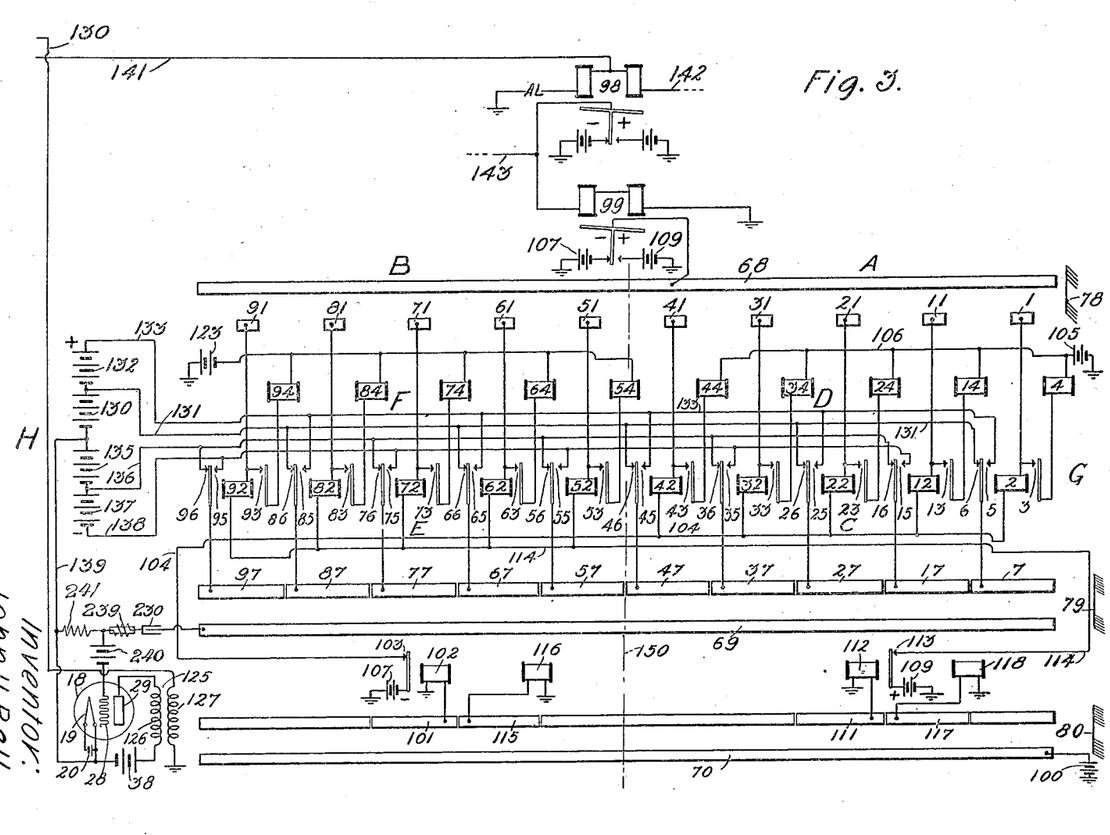
Fig. 3 illustrates an alternate arrangement which may be employed in substitution of the equipment shown in Fig. 2.

Referring to Fig. 3 of the drawing, the principal difference between this alternate arrangement and the arrangement shown in Fig. 2 is the substitution of a group of direct current sources shown as batteries H for the alternating current generator 121 and the employment of an amplifier relay 18 for controlling current action in the transformer 125 for impressing repeated impulses on the cable 8.

In describing the operation of this alternate arrangement let it be considered as substituted for the arrangement shown in Fig. 2. Since corresponding characters of reference have been employed as far as possible in these figures of the drawing and in view of the majority of the operations being obvious, following an understanding of the foregoing description, attention will be more particularly confined to the features by which the two arrangements differ.

In describing this alternate arrangement, let it first be assumed that a series of five impulses in the successive order of positive, negative, positive, positive and negative are received from the line 142. Since the first impulse of the series is of positive polarity, the polar relay 98 will work the polar relay 99, as described, and the first impulse will accordingly include the source of positive current 109 with the distributer ring 68. The brush 78 in phase with this impulse will be passing over the segment 1, thereby extending a connection from the source 109, through the winding of the relay 2, a bus conductor 104 and the contacts 103 of the lock release relay 102, to the negatively poled source 107. The relay 2, therefore, operates and establishes a self-locking circuit through its contacts 3, and the magnet 4, from the positively poled source 105. Separation of the contacts 6 of the relay 2 disconnects a bus conductor 131 half-tapped intermediate serially connected sources of current 130 and 132, and the closing of contacts 5 of the relay 2 establishes the segment 7 of the distributer with a bus conductor 133, which is included with the extreme potential terminal of the source formed by the positively-poled sources 130 and 132.

The second impulse from the line conductor 142 being negative, the relay 99 will be correspondingly biased to include the source 107 with the collector ring 68. Although the brush 78 will now be over the segment 11, the corresponding relay 12 will not respond, since the grounded source of current 107 at the relay 99 is the same or of the same polarity and potential as the source 107 at the relay 102 to which the relay bus 104 is connected, as already traced. The contacts 16 of the now inert relay 12 include the segment 17 with a bus conductor 136 which is half-tapped intermediate serially connected sources of negatively-poled current 135 and 137. The following three impulses—positive, positive and negative—from the line 142, will respectively operate the relays 22 and 32 while the relay 42 will continue inert, the magnets 24 and 34 also being operated while the magnet 44 continues inert, all as effected through operations respectively corresponding with those already described in connection with the relays 2 and 12. The contacts 25 of the relay 22 include the positive current bus 133 with the segment 27, the contacts 35 of the relay 32 connect the segment 37 with a bus conductor 138 which extends to the extreme or high potential negative pole of the serially connected sources 135 and 137. The normal contacts 46 of the relay 42 include the segment 47 with the current bus 131.

In its regular travel through the zone A, the transmitting brush 79 will establish the high-potential and positively poled current bus 133 now included with the segment 7 as described, with the collector ring 69, thence this current acts through the circuits formed by the condenser 230, the impedance or inductance 239 and a source of current 240 to electrically affect the grid 28 of the amplifier 18, thereby acting with the hot filament 19 and a conductor 139, connected in half-tap at an intermediate point on the current sources H. The battery 240 maintains the grid 28 negative with respect to the filament 19, and a resistance 241 serves with the battery in this connection. As connected, the conductor 139 establishes, in connection with the bus conductors 131, 133, 136 and 138, positive and negative potentials of maximum and minimum strengths through the distributer equipment. Electrical action set up in the amplifier relay 18 through the circuit traced, establishes current change in the loop completed through the current source 38, filament 19, plate 29 and winding 126 of the transformer 125. Translation of this effect to the winding 127 of the transformer sets up a corresponding impulse of high potential current through the conductor 130 to the submarine cable 8 (Fig. 1). From the segment 17 the brush 79 connects the intermediate potential and negatively poled bus 136 to the collector ring 69, whence it sets up current changes in the circuit already traced from the segment 7 to establish an oppositely poled current impulse of minimum potential through the conductor 130 to the cable 8. At segment 27 the high potential positive current bus 133 is connected through the brush 79 to establish a current of corresponding polarity and strength in the cable 8. From segment 37 the high potential negative bus 138 will correspondingly establish current action in the cable 8, and from the segment 47, the minimum potential positive bus 131 establishes a current of related polarity and strength in the cable 8.

In traversing its path through the zone F, the brush 78 is effective to control the relays E in conformity with incoming impulses from the line 142, and the brush 79 thereafter following through its path, releases polarities and current strength thereof to effect corresponding changes of current in the cable 8 in a manner similar to the operations already described in connection with the zone A.

In passing through its path in the zone B, the brush 80 first includes the current source 100 over the segment 115 to operate the magnet 116, whereby a printing cycle is initiated corresponding with selections established by the magnets D as selected by the five impulses just traced, following which the brush 80 causes the segment 101 to be energized, thereby operating the relay 102 to separate its contacts 103, thereby disconnecting and permitting the relays 2, 22 and 32 and in turn the selecting magnets 4, 24 and 34, to restore.

As already stated the arrangement shown in Fig. 3 of the drawing provides for the substitution of sources of direct current for an alternating current generator. In this connection, it will be pointed out that features of the condenser 230 and the inductance 239 are to render the direct current impulses less abrupt by removing the "corners" thereof and so modifying the impulses that they will be smooth or rounded to a wave form more nearly corresponding with currents produced by a sine wave alternator for which the direct current sources have been substituted. It will also be mentioned that in situations where it may be possible or desirable to dispense with the amplifier equipment, the circuit from the sending ring 69 may be connected to include only the condenser 230, inductance 239, transformer winding 126 and return conductor 139; the batteries 38, 240, resistance 241 and amplifier 18 being eliminated from the sending circuits.

In the operation of the present system it is contemplated that the distributer (Fig. 1) employed in the reception of signals from the cable 8 will be operated in synchronism with a transmitting equipment employed at the distant end of the cable, and that this distributer equipment will, in the matter of driving speed, be separate and distinct from the driving speed of the distributer (Figs. 2 or 3) employed in the reception of signals from the land line 142. The latter distributer will, of course, be maintained in synchronism with a transmitting station at a distant point on or at the terminal of the land line 142.

Synchronizing arrangements suitable for accomplishing the results described are well-known in the art, and the matter of independent speeds for the distributers respectively corresponding with messages from the cable to the land line and vice versa provide that messages may be transmitted in one direction at speeds entirely independent of the speeds at which messages may be under transmission at the same time in the opposite direction.

In the foregoing description of the present system the methods employed for message transmission over the land line circuit have been arranged in keeping with the usual practice for such telegraph working in order to facilitate the matter of transferring or interconnecting different land lines to a submarine cable, all as may be necessitated in the commercial handling and routing of telegraphic traffic. It will be understood, however, that the present system may be considered as contemplating the employment of wave-currents on a land-line section in situations where such alternate arrangement would be desirable, or in establishing repeater service between two submarine cables. Since all equipment necessary for such repeater service is illustrated in the present drawings, a form or arrangement for such equipments will now be described in connection with these drawings without adding other drawings to the case.

In forming a system whereby wave-currents may be employed for the transmission of signals in each of a plurality of circuits interworking through repeater means, let it be assumed that an equipment similar to the distributer and the generator 121 and its associated devices shown in Fig. 2, be substituted for the distributer equipment shown in Fig. 1, and in turn, the employment of a receiving arrangement similar to the entire equipment intermediate the cable 8 and the distributer shown in Fig. 1 in substitution of the receiving equipment intermediate the land line 142 and the distributer shown in Fig. 2 of the drawing. An additional change requires earth connections in substitution of the current sources 107 and 109 adjacent the relays 102 and 112, respectively, of the distributer, thereby rendering the distributer sections traversed by the brush 80 in the present arrangement similar to the corresponding section, as shown in Fig. 1.

From the description already given of the system it will be obvious that by this alternate coördination of the equipments, wave-currents distinguished or characterized by different strengths of the alternations thereof may be received from the land line section 142 and retransmitted in the form of new or regenerated wave currents of similar selectable characteristics to the submarine cable 8, and vice versa, with respect to the reception and retransmission of wave currents routed from the cable 8 to the line 142.

It will be further pointed out that a substitution or rearrangement of the apparatus shown in Fig. 3 of the drawing may be carried out in connection with Fig. 1 in a manner somewhat similar to that just described in connection with Figs. 1 and 2. Such arrangement of the system would result in signaling being carried on in both the cable 8 and the line 142 on the basis of alternations of potential from the direct current source H in which signaling would be effected by different strengths of such alternate polarities of direct currents, as already described.

In situations where it may be desirable to employ a system of wave currents, as illustrated in Fig. 1, for transmission over one line circuit, and the system of successively alternating polarities of direct currents as illustrated in Fig. 3, over another line circuit, it will be clear that the use of distributer equipments modified by the elimination of the sources of current 107 and 109, as already described, and the employment of receiving equipment similar to that shown in Fig. 1, in substitution of the receiver equipments shown with these distributers, messages may be transmitted over, say, the cable 8 by means of wave currents and over the land line 142 by means of direct currents successively reversing in polarity, all as illustrated and already described.

From the foregoing description, it will be clear that, in general, impulses rendered selectable through varying strengths of alternations of wave currents incoming from a submarine cable are received, amplified, stored and retransmitted to a land line section, and that in such operations the impulses are regenerated or corrected, true to predetermined form with respect to potential and duration of each retransmitted impulse. Correction of repeated impulses is particularly effected through the employment of relatively short segments placed central in their respective positions on the receiving sections of the distributer, in order to utilize only the better or middle portion of such impulses, while the segments on the sending or retransmitting sections of the distributer are of greater length, thereby effecting a length of impulse corresponding with the time required by a sending brush in passing over such a segment.

It will also be clear that impulses received from a land line section are conversely received, stored and retransmitted to a submarine cable in the form of either continuous alternations of wave currents or in the form of successively alternate polarities of direct currents. In such operations the impulses are, as described, corrected or regenerated true to predetermined form and if desired, suitably amplified.

What is claimed is:

1. In combination with a submarine telegraph cable circuit and a land line circuit, means for the reception of signaling impulses formed by incremented half-waves of unbroken wave currents from said cable, and means for translating in said land line circuit impulses formed from direct currents.

2. In combination with a first and a second telegraph circuit, means for employing incremented half-waves of an alternating current for signaling in said first circuit, means for employing direct currents for signaling in said second circuit, and means for translating said incremented half wave currents into direct currents in repeating signals from said first to said second circuit.

3. In combination with a submarine telegraph cable circuit and a land line circuit, means for the reception of signaling impulses formed of direct currents from said land line, and means for translating said impulses into incremented half wave currents in repeating from the land line into the cable.

4. In combination with a land line and a submarine cable, means for repeating telegraphic impulses from the land line to the cable comprising means for the reception and storing of impulses distinguished by different polarities of current from said land line, means for translating said impulses into impulses distinguished by varying strength and current, and amplifying means to relay said translated impulses into said cable.

5. In combination with a submarine cable and a land line, means for repeating telegraphic impulses from the cable to the land line comprising current-amplifying reception means, and means operating therewith for storing incoming signaling impulses formed of incremented half-waves of unbroken wave currents from said cable and through the employment of direct current sources translating said incremented half-wave impulses into direct currents in said land line.

6. In a telegraph repeater system, a submarine cable, a land line, means for the employment of varying strength of alternations of wave currents for signaling over said cable, means for the employment of opposite polarities of direct current for signaling over said land line, distributer means effective with the signaling means of said cable and said land line, and relays effective with said distributer for the reception and storing of impulses from said cable and their translation into said land line.

7. In a system for repeating telegraphic signals between circuits having inherently different electrical characteristics, means for working impulses characterized by different strength of alterations of wave currents, means for working impulses characterized by different polarities of direct currents, and means effective with said means for working wave currents and said means for working direct currents for the reception, storing and translation of wave impulses into direct current impulses and vice versa.

8. In a telegraph repeater system, a submarine cable over which signaling is effected by different strengths of alternations of wave currents, a plurality of polar relays responsive to said alternations which have maximum strength only, distributer means, sources of current, a land line over which signaling is effected by different polarities of direct current, and a plurality of relays effective with said polar relays and said distributer for repeating telegraphic signals between said submarine cable and said land line.

9. In a telegraph repeater system, a land line circuit over which signaling is effected by impulses of different polarities, polarized relay means selectively responsive to said impulses, sources of direct current, a submarine cable circuit over which signaling is effected by alternations of different strength of wave currents, distributer means, and a plurality of relays effective with said polar relay means and said distributer means for the reception of signals from said land line and the control of said source of wave-currents to retransmit said signals to said submarine cable.

10. In a telegraph repeater system, a first circuit having low time constant electrical characteristics, a second circuit having high time constant electrical characteristics, means for signaling over said first circuit by means of unbroken alternating wave currents, means for signaling over said second circuit by means of energy from direct current sources, distributer means, and a plurality of relays effective with said distributer means and the signaling means of said first and second circuits for translating alternating signaling currents to direct currents from said first to said second circuit.

11. In a telegraph repeater system, a first circuit having high time constant electrical characteristics, a second circuit having low time constant electrical characteristics, means for signaling over said first circuit by means of energy from direct current sources, means for signaling over said second circuit by means of unbroken alternating wave currents, distributer means, and a plurality of relays effective with said distributer means and the signaling means of said first and second circuits to translate direct current signals to alternating current signals from said first to said second circuit.

12. In a telegraph repeater system, a duplexed submarine cable and a duplexed land line, a first and a second distributer, relays associated with each of said distributers, means including current amplifier means and sources of direct current effective with the first distributer and its associated relays to receive, store and repeat signals from said submarine cable to said land line, and means including inductance and capacity units effective with the second distributer and its associated relays to receive, store and repeat signals from said land line to said cable independently of the described operations of repeating from the cable to the land line.

In witness whereof, I hereunto subscribe my name this 30th day of October A. D., 1917.

JOHN H. BELL.